United States Patent [19]

Wurfel

[11] 4,204,620

[45] May 27, 1980

[54] APPARATUS FOR REMOVING EXPOSED FILMS AND BACKING STRIPS FROM CASSETTES

[75] Inventor: Reinhart Würfel, Münich, Fed. Rep. of Germany

[73] Assignee: AGFA-Gavaert Aktiengesellschaft, Leverkusen, Fed. Rep. of Germany

[21] Appl. No.: 954,092

[22] Filed: Oct. 24, 1978

[30] Foreign Application Priority Data

Oct. 28, 1977 [DE] Fed. Rep. of Germany ....... 2748551

[51] Int. Cl.[2] ......................... G03B 1/56; B65H 17/42

[52] U.S. Cl. ......................................... 226/91; 226/92; 226/109

[58] Field of Search ................. 226/62, 91, 92, 5, 109; 352/157, 158; 354/212; 242/197; 156/584

[56] References Cited

U.S. PATENT DOCUMENTS

| | | | |
|---|---|---|---|
| 3,780,922 | 12/1973 | Bloemendaal | 226/92 |
| 3,921,878 | 11/1975 | Zangenfeind | 226/91 |
| 4,004,724 | 1/1977 | Zangenfeind | 226/91 |

*Primary Examiner*—Edward J. McCarthy
*Attorney, Agent, or Firm*—Peter K. Kontler

[57] ABSTRACT

A container for exposed photographic roll film is so positioned in a film removing apparatus that the observation and exposure openings of its bridge register with a pivotable pusher which thereupon moves forwardly to expel the leader of the backing strip into the nip of a first pair of advancing rolls. The backing strip extracts the film from the takeup section of the container, and a deflector causes the leader of the film to enter a channel wherein the film advances toward a second pair of advancing rolls. The deflector and/or the first pair of advancing rolls defines for the backing strip a path which makes an angle of 30°–60° with the direction of travel of backing strip from the takeup section of the container toward the exposure opening. This insures that the film is not scratched during withdrawal, even if it is tightly wound onto the takeup reel and even if the dimensions of the container deviate from optimum dimensions. An orienting element disengages one edge face of the filin from the adjacent flange of the bridge and causes the other edge face to bear against the other flange whereby the image-bearing central portion of the film remains out of contact with the container. The second advancing rolls rotate at a peripheral speed which exceeds the peripheral speed of the first advancing rolls so that the supply of film which accumulates in the channel is depleted and the film does not contact the surfaces which surround the channel.

17 Claims, 3 Drawing Figures

APPARATUS FOR REMOVING EXPOSED FILMS AND BACKING STRIPS FROM CASSETTES

CROSS-REFERENCE TO RELATED INVENTIONS

The apparatus of the present invention constitutes an improvement over and a further development of apparatus which are disclosed in commonly owned U.S. Pat. Nos. 3,921,878 granted Nov. 25, 1975 to Zangenfeind and 4,004,724 granted Jan. 25, 1977 to Zangenfeind et al.

BACKGROUND OF THE INVENTION

The present invention relates to improvements in apparatus for removing exposed photographic roll films from containers or cassettes of the type wherein the film is located in front of a backing strip and is expelled from the takeup section of the container in response to withdrawal of the backing strip through an exposure opening which is provided in an intermediate section or bridge of the container.

U.S. Pat. No. 3,921,878 to Zangenfeind discloses an apparatus wherein one end of the backing strip in the properly located container for exposed photographic roll film is expelled from the intermediate section via exposure opening in response to forward movement of a pivotable pusher which enters the intermediate section by way of a second opening serving to permit observation of indicia which are applied to the rear side of the backing strip in order to enable the user of a camera to ascertain the number of exposed or unexposed film frames. When the pusher performs a forward stroke, the one end of the backing strip is caused to enter the nip of two advancing rolls which are driven to draw the backing strip from the takeup section of the container whereby the leader of the film emerges from the exposure opening, is separated from the backing strip by a deflector and enters a channel to advance toward the nip of a second pair of driven advancing rolls which transport the film toward a further processing station, e.g., into the range of a splicing device which attaches the leader of the film to the trailing end of a preceding exposed film.

The apparatus which is disclosed in U.S. Pat. No. 4,004,724 to Zangenfeind et al. is designed to prevent the tendency of the exposed film to curl from interfacing with orderly transport of the film toward the next processing station. To this end, the apparatus of Zangenfeind et al. comprises means defining a relatively narrow film channel wherein the film advances from the exposure opening toward the respective advancing rolls or directly to the splicing station and a roll or an analogous device which is closely adjacent to the location where the leader of the film emerges from the bridge of the container to advance toward the inlet of the film channel. The roll prevents the leader of the film from advancing along a path other than toward and into the inlet of the film channel.

In the just described apparatus, the film is withdrawn in such a way that the film portion which extends between the takeup section and the exposure opening is substantially parallel to the rear wall of the aforementioned bridge, namely, to the wall which is formed with the observation opening. This is considered desirable and necessary in order to prevent the emulsion-coated surface of the film from rubbing against the edge of the bridge, namely, that edge which is nearest to the takeup section and bounds a portion of the exposure opening. The aforementioned roll in the apparatus of Zangenfeind et al. can be placed directly into the exposure opening so that it positively prevents any rubbing contact between the film and the edge bounding the exposure opening.

It has been found that the apparatus which are disclosed in the aforediscussed patents are ideally suited for withdrawal of exposed films from precision-finished containers and when the films are exposed in sophisticated cameras wherein the film transporting mechanism includes a clutch which prevents excessive tensioning of the film when the user of the camera attempts to advance the film upon completion of exposure of the last film frame. At the present time, the majority of roll films are exposed in inexpensive cameras with rudimentary film transporting mechanisms which do not embody a friction clutch or an analogous device capable of preventing complete extraction of the trailing end of the film from the supply section of the container or pronounced tensioning of the exposed film when the user attempts to advance the film under the aforementioned circumstances, i.e., upon completion of the last exposure. Moreover, all or nearly all containers for photographic roll film consist of synthetic plastic material whose components are welded together in response to the application of heat and/or pressure. The regions where the components of a mass-produced plastic container are welded together exhibit pronounced seams some of which are located in the interior of the container so that they interfere or are likely to interfere with predictable transport of the film, especially during withdrawal of exposed film through the exposure opening. In addition, the relative positions of components in fully assembled condition of a mass-produced plastic container deviate from optimum positions, often by as much as one-tenth or two-tenths of one millimeter. This, too, creates problems during withdrawal of exposed film through the exposure opening of a container. In many instances, a film which is exposed in an inexpensive camera wherein the film transporting mechanism does not embody a clutch or the like lies askew, i.e., it rubs against one flange of the bridge of the container. This is attributable, at least in part, to the fact that the containers are provided with tooth-like or toothed catches which engage one side of the trailing end of the film and cause at least some changes in orientation of the film when the latter is forcibly pulled by the transporting mechanism upon completion of exposure of the last film frame. The change of orientation may result in frictional engagement between the trailing portion of the film and a seam at the inner side of the bridge of the container; this further complicates the withdrawal of exposed film by way of the exposure opening. Therefore, when the film is to be withdrawn in apparatus of the type disclosed in the aforementioned patents to Zangenfeind and Zangenfeind et al., it is likely to cause breakage of the backing strip. Moreover, it happens quite frequently that exposed film which is stored in the takeup section finds its way to the rear side of the backing strip and cannot be introduced into the film channel. Still further, it can happen that the trailing portion of the exposed film changes its orientation to such an extent that it cannot be expelled via exposure opening in response to forward movement of the pusher because its frictional engagement with the adjacent component or components of the container is too strong.

OBJECTS AND SUMMARY OF THE INVENTION

An object of the invention is to provide an apparatus which serves for withdrawal of exposed photographic roll films from cassettes or analogous containers and is constructed and assembled in such a way that it can expel exposed film from the container even if the orientation of exposed film in the container deviates from ideal orientation.

Another object of the invention is to provide an apparatus which can expel exposed films from containers even if the dimensions and/or other characteristics of containers deviate from standard characteristics, e.g., if the containers are mass-produced and exhibit welded seams which would or could interfere with expulsion of exposed films in previously known apparatus.

An additional object of the invention is to provide an apparatus which can properly withdraw or expel exposed films from containers whose contents were exposed in inexpensive cameras and regardless of whether or not the user of the camera subjected the film to pronounced (i.e., unnecessarily high) tensional stresses upon completion of the last exposure.

A further object of the invention is to provide an apparatus which is not likely to scratch or otherwise deface or damage the emulsion-coated sides of exposed films and which can be used for automatic expulsion of films from high-quality containers, low-quality containers and/or containers wherein the film is misoriented for reasons other than the defects in the design and/or making of containers.

Another object of the invention is to provide an apparatus which enables the backing strip to assist in withdrawal of exposed photographic roll film from the respective container in a novel and improved way.

The invention is embodied in an apparatus for removing convoluted exposed photographic films and customary backing strips from containers (e.g., cassettes) of the type wherein a central section or bridge of the container has registering first and second openings (one of these openings preferably constitutes the observation opening for indicia which are applied to the rear side of the backing strip, and the other opening is the exposure opening through which scene light is admitted against successive film frames when the container is inserted into a camera and the user of the camera opens the shutter subsequent to actuation of the film transporting mechanism which serves to advance the film and the corresponding portion of the backing strip from a supply section of the container into the aforementioned central section or bridge), wherein the leader of the backing strip is located between the two openings when the film is fully exposed, and wherein the central section of the container confines a length of the backing strip to movement in a predetermined direction during intervals between successive exposures (i.e., when the film transporting mechanism of the camera is actuated to advance the film by the length of a frame and to thus place an unexposed film frame in register with the exposure opening of the central section).

The apparatus comprises a pusher which is movable (e.g., pivotable) forwardly and backwards, suitable locating means which serves to support a container with exposed film therein in such position that the openings of the central section are in register with the pusher whereby the pusher passes (during forward movement thereof) first through one and thereupon through the other opening and expels the leader of the backing strip through the other opening, two driven rolls or other suitable advancing means located behind the other opening and serving to engage the expelled leader of the backing strip and to advance the thus engaged backing strip lengthwise along a predetermined path to thereby draw exposed film from the container through the intermediary of the backing strip, the predetermined path making with the aforementioned direction an angle of 30 to 60 degrees (preferably 42–48 degrees), and means defining a film channel having an inlet which is adjacent the other opening. The apparatus further includes means for deflecting the film into the channel in response to advancement of the backing strip along its path. The path for the backing strip can be defined by the advancing means and/or by the deflecting means.

The central section of the container has a rear wall with a preferably flat front surface which is adjacent to the rear side of the backing strip, and the apparatus further comprises orienting means having an annular or otherwise configurated and preferably inclined surface positioned to urge successive increments of one marginal portion of the film toward the front surface of the rear wall of the central section. This insures that such marginal portion of the film does not rub against the container during extraction of exposed film from the container. The rear wall of the central section is normally provided with a catch (e.g., a toothed portion or a single tooth) which can enter a perforation or hole of the film and/or backing strip to prevent complete retraction of the film and backing strip into the takeup section of the container. Such catch is adjacent that marginal portion which is engaged by the aforediscussed surface of the orienting means. This insures that the film is disengaged from that part of the central section against which it rubs with a pronounced force if the user of the camera attempts to forcibly advance the film into the takeup section after exposure of the last film frame.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
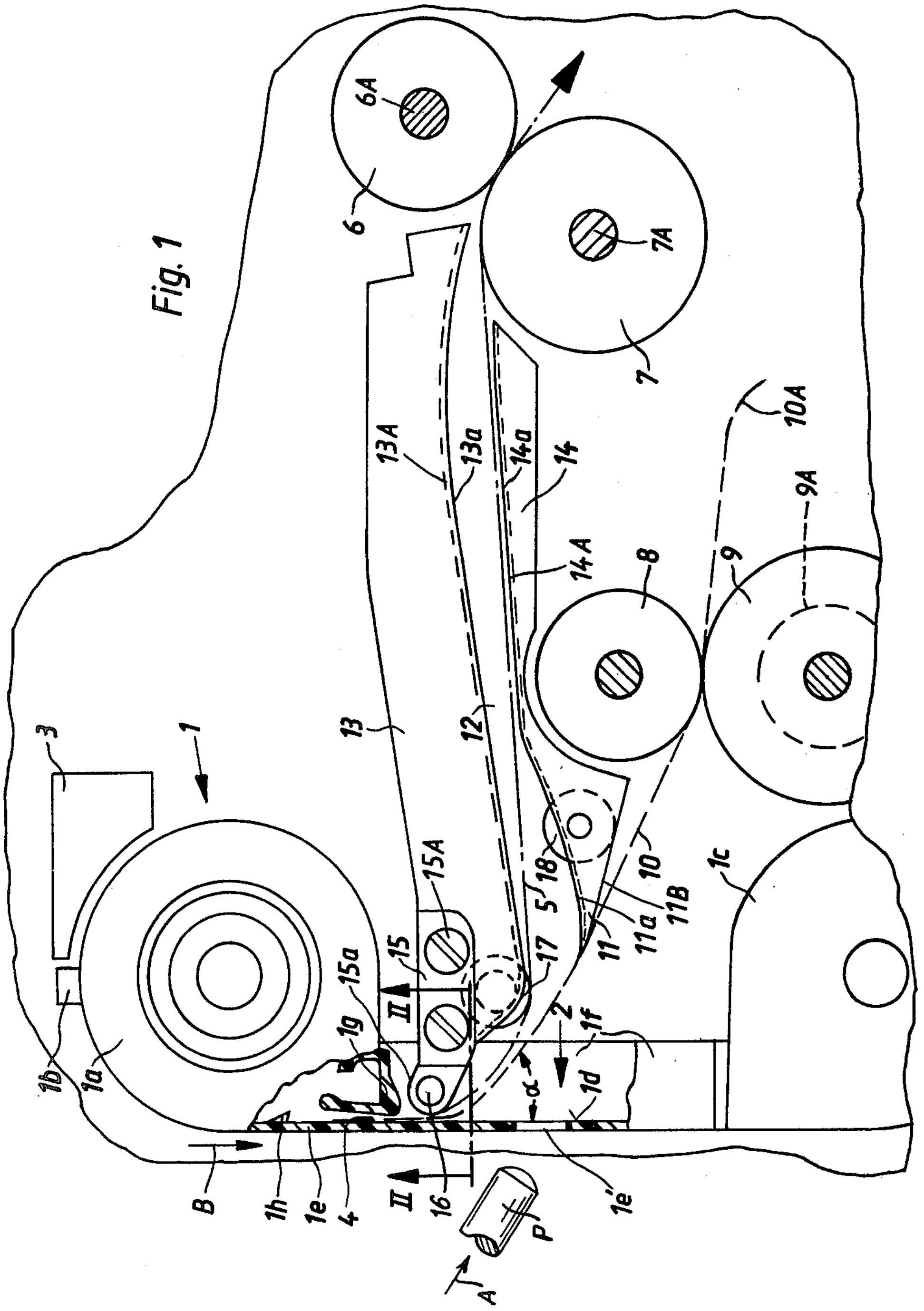
FIG. 1 is a schematic partly elevational and partly longitudinal vertical sectional view of an apparatus which embodies one form of the invention.

Referring first to FIG. 1, there is shown a container or cassette 1 for exposed photographic roll film 5 and a backing strip 10 (normally a paper web whose rear side bears customary indicia in the form of numerals identifying the adjacent frames of the film). The container 1 comprises a takeup section 1*a* confining a reel for exposed film frames and for the corresponding portions of the backing strip, a supply section 1*c* which confines a reel for unexposed film and the corresponding portions of the backing strip, and a central section or bridge 1*d* which includes a substantially flat rear wall 1*e* with an observation opening 1*e'* and two lateral walls or flanges 1*f*. The walls 1*e*, 1*f* define an elongated channel wherein the film 5 and the backing strip 10 advance when the container 1 is confined in the chamber of a camera and the film transporting mechanism of the camera is actuated to advance the film by the length of a frame prior to the making of an exposure. The exposure opening is shown at 2; a portion of this opening registers with the observation opening 1*e'* so that a pusher P (a portion of which is shown in FIG. 1) can expel one end portion 10A (hereinafter called leader) of the backing strip 10 from the section 1*d* when the pusher performs a forward stroke (arrow A) in order to move the leader 10A of the backing strip through the exposure opening 2 and toward the nip of two driven advancing rolls 8 and 9. The advancing roll 9 has a circumferential groove 9A which receives the tip of the pusher P when the latter completes its forward stroke. This insures that the leader 10A of the backing strip 10 enters the nip of the rolls 8, 9 and is positively entrained and advanced in a manner as disclosed in the aforementioned patent to Zangenfeind. The section 1*a* of the container 1 has at least one protuberance 1*b* which bears against a stationary locating device 3 to thus insure that the openings 1*e'* and 2 are located in the path of movement of the pusher P when the latter performs a forward stroke. At least one additional protuberance can be provided on the section 1*c* to engage further locating means in a manner as shown in the aforediscussed patents to Zangenfeind and Zangenfeind et al. The disclosures of these patents are incorporated herein by reference.

A constricting element or gate 1*g* which forms part of the section 1*a* and/or 1*d* defines with the front side of the wall 1*e* a narrow clearance or gap 4 through which successive increments of the webs or strips 5, 10 advance on their way toward the takeup reel in the section 1*a* or during expulsion or withdrawal from the section 1*a*.

The apparatus further comprises two driven film advancing or transporting rolls 6 and 7 which serve to advance the film 5 into the range of a splicing device (not specifically shown). The splicing device connects the leader of the film 5 with the trailing end of the exposed film which was withdrawn from the preceding container. The spliced-together films form a long web which is transferred into the developing machine in a photographic processing laboratory.

A tongue-like deflector 11 is mounted adjacent to the exposure opening 2 of the container 1 which is located at the funnel-shaped inlet of an elongated film channel 12 wherein the film 5 advances toward the nip of the rolls 6, 7 in response to extraction of the backing strip 10 by the rolls 8 and 9. The channel 12 is defined by a first channel-forming or channel-defining member 13 having a concave surface 13*a* at the upper side of the channel, and by a second channel-forming or channel-defining member 14 having a surface 14*a* at the underside of the channel. Thus, the leader of the film 5 slides along the surface 13*a* or 14*a* during travel toward the nip of the advancing rolls 6 and 7. The deflector 11 may be rigidly connected to or integral with the channel-forming member 14, and its upper side or surface 11A merges into the surface 14*a*. The backing strip 10 slides along the underside 11B of the deflector 11 on its way toward the advancing rolls 8 and 9. In accordance with a feature of the invention, the path portion along which the strip 10 moves from the gap 4 to the point or tip of the deflector 11 and the direction (arrow B) in which the strip moves from the interior of the section 1*a* toward and through the gap 4 make an angle alpha of between 30 and 60 degrees, preferably between 42 and 48 degrees. The path portion between the point of the deflector 11 and the nip of the rolls 8, 9 may but need not be coplanar with the aforementioned path portion between 4 and 11. The nip of the rolls 8, 9 can be positioned in such a way that the path for the backing strip 10 and the direction B define the aforementioned angle alpha solely as a result of exertion of a pull upon the strip by the rolls 8 and 9.

Figure 2:
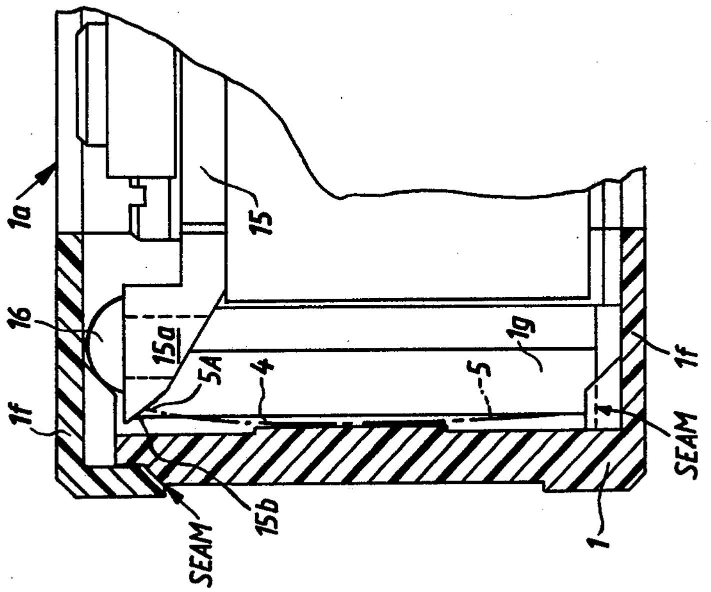
FIG. 2 is an enlarged transverse vertical sectional view as seen in the direction of arrows from the line II—II of FIG. 1.

The channel-forming member 13 carries an orienting or disengaging element 15 having a projection 15*a* adjacent to one of the flanges 1*f* and provided with an inclined surface 15*b* (see particularly FIG. 2). When the container 1 is properly located in the apparatus, the surface 15*b* of the projection 15*a* is adjacent to the edge of one marginal portion of the film 5 close to the gate 1*g*. The orienting element 15 may consist of an elastomeric material or may be yieldably mounted on the channel-forming member 13. In the illustrated embodiment, the element 15 is elastic and is secured to the member 13 by screws 15A. It suffices to employ an orienting element which is partly elastic or yieldable, i.e., its projection 15*a* may consist of a suitable elastomeric material.

The element 15 further comprises a distancing portion or spacer 16 (e.g., a substantially hemispherical extension of the projection 15*a*) which maintains the inclined surface 15*b* at a predetermined distance from the adjacent flange 1*f* of the section 1*d*. The portion 16 constitutes a component of the means for locating the container 1 in the apparatus.

The operation of the apparatus is as follows:

A container 1 which is loaded with exposed roll film 5 is inserted into the apparatus so that the protuberance 1*b* of its section 1*a* abuts against the locating device 3 and its other protuberance or protuberances abut or enter further locating means in order to insure that the openings 1*e'* and 2 are located in the path of forward movement (arrow A) of the pusher P. The latter is held in retracted position during insertion of a fresh container 1. As disclosed in the aforementioned patents to Zangenfeind and Zangenfeind et al., the leader 10A of the backing strip 10 is disposed between the openings 1*e'* and 2 so that it can be expelled by the pusher P when the latter performs a forward stroke. The tip of the pusher P advances all the way into the groove 9A to thus insure that the strip 10 is positively engaged and advanced by the rolls 8, 9. The pusher P is thereupon returned to its retracted position and remains in such position until after the illustrated container 1 is replaced with the next container containing exposed but undeveloped photographic roll film.

The rolls 8 and 9 cause the backing strip 10 to slide along the underside 11B of the deflector 11 whereby the strip portion between the gap 4 and the tip of the deflector 11 makes an angle alpha with the direction of advancement of the strip 10 toward the gap 4 (see the arrow B). It can be said that the angle alpha is defined by the strip portion between the gap 4 and the tip of the deflector 11 on the one hand, and by the flat front side of the rear wall le of the intermediate section or bridge 1*d* of a properly inserted and positioned container 1.

The strip 10 causes the takeup reel in the section 1*a* to rotate and to pay out the film 5. Thus, the leader of the film 5 emerges from the section la via gap 4 to advance along the projection 15*a* and (if necessary) to be separated from the strip 10 by the tip of the deflector 11 so that it enters into and advances in the channel 12. The strip portion between the gap 4 and the tip of the deflector 11 directs the leader of the film 5 away from the rear wall 1*e* of the section 1*d*. The edge of one marginal portion (shown at 5A in FIG. 2) of the film 5 advances along the inclined surface 15*b* which is positioned in such a way that it maintains the film out of contact with the gate 1*g*. Since the film is relatively stiff, it is not necessary that the inclined surface 15*b* on the projection 15*a* of the orienting element 15 be immediately adjacent to the gap 4. All that is necessary is to place the element 15 relatively close to the gap 4 and into the path along which the film 5 would move due to its tendency to curl. The edge of the other marginal portion of the film 5 slides along the gate 1*g* so that the film portion in the gap 4 is guided at a slant (see FIG. 2). For the sake of clarity, the backing strip 10 has been omitted in FIG. 2. The result of the just discussed guidance of the film is that only the edge of one marginal portion of the film contacts the section 1*d* and the edge of the other marginal portion contacts the surface 15*b* of the orienting element 15 whereas the emulsion-coated portions of the film remain out of contact with the container.

As the withdrawal of the backing strip 10 under the action of advancing rolls 8 and 9 continues, the leader of the film 5 advances into and through the channel 12. The tip of the deflector 11 insures that the film 5 cannot follow the path for the strip 10. The leader of the film 5 slides along the concave surface 13*a* and moves on toward the nip of the advancing rolls 6 and 7. Since the film exhibits a tendency to curl or roll, namely, in a counterclockwise direction, as viewed in FIG. 1, its leader normally advances along the concave surface 13*a*.

The speed at which the shafts 6A and 7A drive the rolls 6, 7 is preferably such that the peripheral speed of these rolls exceeds the peripheral speed of the rolls 8, 9 for the backing strip 10. Prior to entering the nip of the rolls 6 and 7, the leader of the film 5 abuts against and is temporarily braked by one of the rolls 6, 7 for a relatively short interval of time while the rolls 8, 9 advance the web 10 toward a collecting receptacle or to another destination. This causes a certain pileup of exposed film in the channel 12 and such accumulation of film propagates itself all the way to the deflector 11 whereby the film lies against the surface 11A. In order to avoid the likelihood of excessive frictional engagement between the rear side of the film 5 and the surface 11A, the deflector 11 preferably carries one or more idler rollers 18 (one shown in FIG. 1).

As soon as the leader of the film 5 enters the nip of the rolls 6 and 7, the supply of film in the channel 12 begins to decrease because the peripheral speed of the rolls 6, 7 exceeds that of the rolls 8, 9 for the backing strip 10. Since the leader of the film 5 does not carry an image, and since this leader is normally long enough to fill the channel 12 prior to entering the nip of the rolls 6 and 7, the supply or pileup in the channel 12 is reduced to zero (as a result of rapid rotation of the rolls 6, 7) before the first exposed film frame moves into the range of the idler roller 18, i.e., such first exposed frame bypasses the roller 18 by travelling along the surface 13*a* and on toward the nip of the rolls 6 and 7. In other words, the film 5 is tensioned in the region between the container 1 and the advancing rolls 6, 7. Therefore, it is advisable to provide a roller 17 in the region of the orienting element 15, i.e., in the general area of the funnel-shaped inlet of the channel 12. This roller 17 is engaged by the front side of the travelling film 5 and is positioned in such a way that the film normally advances through the entire channel 12 without touching the surface 13*a* and/or 14*a* (see FIG. 1). It is preferred to use a roller 17 including two spaced-apart coaxial wheels which merely engage the marginal portions of the film 5 in the region below the orienting element 15. This insures that the roller 17 cannot scratch or otherwise deface or damage the film frames.

The surface 13*a* and/or 14*a* may be provided with longitudinally extending raised portions 13A, 14A (e.g., in the form of ribs) which flank elongated recesses or depressions and prevent direct contact between exposed film frames and the channel-forming member 13 and/or 14. The ribs 13A, 14A merely engage the marginal portions of the advancing film. Such ribs are desirable when the film exhibits an unusual tendency to roll or curl, either clockwise or counterclockwise, during travel through the channel 12.

As a rule, the tip of the deflector 11 has a straight edge which extends transversely of the film path. However, it is also possible to provide the tip of the deflector (shown at 11' in FIG. 3) with a substantially paraboloid front end portion 19 which converts the adjacent portions of the backing strip 10 into troughs, especially if the strip 10 is subjected to a rather pronounced tensional stress. This enhances the film deflecting action of the device 11', i.e., it can direct into the channel 12 a film which exhibits a strong tendency to roll as well as a film which clings to the adjacent side of the backing strip 10 and tends to advance therewith toward the nip of the rolls 8 and 9. The roll 9 may be biased against the roll 8 in a manner as disclosed and shown in the aforediscussed patents to Zangenfeind and Zangenfeind et al.

Figure 3:
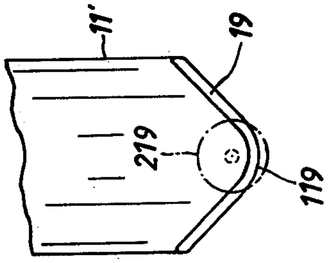
FIG. 3 is a fragmentary plan view of a modified film deflector which can be used in the apparatus of FIGS. 1 and 2.

The pointed central part of the front and portion 19 penetrates between the adjacent trough-shaped portion of the strip 10 and the leader of the film 5 to thus invariably insure that the film is caused to enter the channel 12 and advances toward the nip of the film advancing rolls 6 and 7. It has been found that a deflector having a configuration of the type shown in FIG. 3 is highly unlikely to deform and/or otherwise damage or deface the front edge portion of the film during withdrawal from the section 1*a* of a properly located container. The central part of the front end portion 19 of the deflector 11' can be provided with a sharp edge 119 and/or it may carry a small roller (shown by broken lines, as at 219).

It is further possible to replace the projection 15*a* of the element 15 with a small rounded projection whose annular surface engages the edge of the adjacent marginal portion of the film.

The leader 10A of the backing strip 10 can be guided through a channel and on toward the aforementioned collecting receptacle for withdrawn backing strips.

An important advantage of the improved apparatus is that it can properly withdraw films from containers which are not manufactured with a high degree of precision, e.g., wherein the flanges 1*f* are connected to the rear wall 1*e* of the section 1*d* by welds having pronounced seams in the interior of the section 1*d* so that such seams could interfere with extraction of exposed film. The element 15 insures that the edge of the adjacent marginal portion of the film slides along the surface 15*b* and is thereby held out of contact with the respective flange 1*f*. The element 15 further lifts the adjacent marginal portion of the film off the gate 1*g*. Moreover, the image bearing portions of the film are held out of contact with any and all parts which surround or are adjacent to the exposure opening 2.

Another advantage of the apparatus is that the peripheral speed of the rolls 6, 7 exceeds the peripheral speed of the rolls 8, 9. As mentioned above, the front edge face of the leader of the film 5 initially strikes against and is braked by the roll 6 or 7. This causes the film to accumulate in the channel 12. In the absence of a difference between the peripheral speeds of the rolls 6, 7 and 8, 9, the pileup would remain during extraction of the entire film whereby the film would be likely to rub against the surface 13*a*, 14*a* and/or 11A. The rapidly rotating rolls 6, 7 eliminate the pileup of film in the channel 12 before the foremost film frame enters the preferably funnel-shaped inlet of the channel 12. Such inlet extends from the gate 1*g* to the tip of the deflector 11 or 11'. The difference between the peripheral speeds of the rolls 6, 7 on the one hand and the rolls 8, 9 on the other hand is relatively small, e.g., in the range of 1–2 percent. This does not result in a pileup of backing strip 10 between the cassette and the rolls 8, 9 because the backing strip surrounds the film and also because the length of the film and backing strip is normally less than 1 meter. Moreover, the advancing rolls 6, 7 are preferably friction wheels so that friction between these rolls and the marginal portions of the film 5 can readily compensate for minor differences between the rates of withdrawal of backing strip and film.

FIG. 1 shows a toothed projection 1*h* at the inner side of the rear wall 1*e*. Such projection enters a suitable aperture in the adjacent marginal portion of the end portion or leader 10A of the backing strip 10 to prevent complete retraction of the backing strip into the section 1*a* of the container 1.

It will be readily appreciated that the surface 15*b* need not move the other marginal portion of the film 5 into actual contact with the respective flange 1*f*, i.e., it suffices to insure that the marginal portion 5A does not rub against the adjacent flange 1*f* of the section 1*d*.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the claims.

I claim:

1. Apparatus for removing films and backing strips from containers of the type wherein a section of the container has registering first and second openings, wherein the leader of the backing strip is located between said openings and wherein said section confines a length of the backing strip to movement in a predetermined direction during intervals between successive exposures of film, comprising a pusher movable forwardly and backwards; locating means arranged to support a container in such position that the openings of said section are in register with said pusher whereby the latter passes, during forward movement thereof, first through one and thereupon through the other of said openings and expels the leader of the backing strip through said other opening; advancing means located behind said other opening and arranged to engage the expelled leader of the backing strip and to advance the thus engaged backing strip lengthwise along a predetermined path to thereby draw the film from the container through the intermediary of said backing strip, said path making with said direction an angle of between 30 and 60 degrees; means defining a film channel having an inlet adjacent said other opening; and means for deflecting the film into said channel in response to advancement of the backing strip along said path.

2. The apparatus of claim 1, wherein said angle is between 42 and 48 degrees.

3. The apparatus of claim 1, wherein said section of the container has a rear wall having a front surface adjacent to the backing strip in said section, said deflecting means further comprising orienting means having a surface positioned to urge successive increments of one marginal portion of the film toward said front surface.

4. The apparatus of claim 3, wherein said container further comprises a takeup section adjacent to said first mentioned section and defining a gap which is disposed intermediate said sections and through which the film and the backing strip can enter or leave said takeup section, said orienting means being adjacent said gap.

5. The apparatus of claim 3, wherein the strip has an apertured marginal portion adjacent said marginal portion of the film.

6. The apparatus of claim 3, wherein said orienting means comprises a projection and said surface of said orienting means is provided on said projection.

7. The apparatus of claim 6, wherein said surface of said projection is inclined with respect to the front surface of said rear wall.

8. The apparatus of claim 3, wherein said orienting means comprises a distancing portion abutting against said section.

9. The apparatus of claim 8, wherein said section further comprises two flanges flanking said rear wall and said distancing means abuts against one of said flanges.

10. The apparatus of claim 1, wherein said deflecting means comprises a substantially paraboloidal front end portion engaging the strip in said path intermediate said other opening and said advancing means.

11. The apparatus of claim 1, wherein said channel defining means has surfaces flanking said channel and at least one of said surfaces has a recess and raised portions flanking said recess.

12. The apparatus of claim 1, wherein said deflecting means has a surface flanking a portion of said channel and further comprising a rotary member having a film-engaging portion extending into said channel beyond said surface of said deflecting means.

13. The apparatus of claim 1, wherein said channel-defining means comprises surfaces bounding said channel and said deflecting means has a surface merging into one surface of said channel-defining means, and further comprising a rotary member installed in said channel-defining means and having a film-engaging portion extending beyond said one surface.

14. The apparatus of claim 1, wherein said channel-defining means includes a member having a portion located opposite said deflecting means and further comprising a rotary element mounted in said portion of said member and having a film-engaging portion extending into said channel.

15. The apparatus of claim 14, wherein said rotary element comprises two spaced apart rotary portions which engage the respective marginal portions of the film entering said channel.

16. The apparatus of claim 1, further comprising second advancing means for the film in said channel and means for driving said second advancing means at a speed exceeding the speed of advancement of the backing strip by said first mentioned advancing means.

17. The apparatus of claim 16, wherein each of said advancing means comprises a pair of rolls and said driving means includes means for rotating said rolls of said second advancing means at a peripheral speed exceeding that of the rolls of said first mentioned advancing means.

* * * * *